United States Patent
Honda et al.

(10) Patent No.: US 9,643,591 B2
(45) Date of Patent: May 9, 2017

(54) SPEED CHANGE CONTROL SYSTEM AND SPEED CHANGE CONTROL METHOD FOR HYBRID VEHICLE

(75) Inventors: Tomoyuki Honda, Numazu (JP); Hitoshi Matsunaga, Susono (JP); Souitirou Shimura, Susono (JP); Seiji Masunaga, Susono (JP); Munehiro Katsumata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 89 days.

(21) Appl. No.: 14/375,735

(22) PCT Filed: Feb. 7, 2012

(86) PCT No.: PCT/JP2012/052748
§ 371 (c)(1),
(2), (4) Date: Jul. 30, 2014

(87) PCT Pub. No.: WO2013/118255
PCT Pub. Date: Aug. 15, 2013

(65) Prior Publication Data
US 2015/0012159 A1    Jan. 8, 2015

(51) Int. Cl.
*B60W 20/00*   (2016.01)
*B60W 10/08*   (2006.01)
(Continued)

(52) U.S. Cl.
CPC ............ *B60W 20/10* (2013.01); *B60K 6/445* (2013.01); *B60K 6/547* (2013.01); *B60W 10/06* (2013.01);
(Continued)

(58) Field of Classification Search
CPC ...... B60W 20/10; B60W 10/08; B60W 30/19; B60W 20/00; B60W 10/06;
(Continued)

(56) References Cited

U.S. PATENT DOCUMENTS 6,377,882 B1 * 4/2002 Ito .................... B60W 10/06
                                                        477/102
6,437,456 B1   8/2002 Kimura et al.
(Continued)

FOREIGN PATENT DOCUMENTS

JP   2000-087774 A   3/2000
JP   2005-315084 A   11/2005
(Continued)

OTHER PUBLICATIONS

International Search Report for PC/JP2012/052748, dated May 15, 2012 (PCT ISA 210).

*Primary Examiner* — Redhwan k Mawari
*Assistant Examiner* — Rodney P King
(74) *Attorney, Agent, or Firm* — Sughrue Mion, PLLC

(57) ABSTRACT

A speed change control system for a hybrid vehicle comprised of a first motor-generator, a differential mechanism that distributes a power of an engine to the first motor-generator and to an output member and that changes an engine speed in accordance with a speed of the first motor-generator, and a second motor-generator that exchanges a torque with any of wheels. The speed change control system comprises: a first power control means that outputs a command for changing an engine power in a direction to expedite a change in an engine speed, at the beginning of a speed change for changing the engine speed stepwise; a first speed control means that continues controls of the first and the second motor-generators as before the speed change, during a period from a point at which the first power control means outputs the command for changing the engine power to a point at which a response delay of the engine elapses; a second speed control means that controls the first motor-generator in a manner such that the engine speed is changed in a direction to be changed by the change in the engine power, after a lapse of the response delay of the engine; and (Continued)

a second power control means that outputs a command for changing the engine power to a power to be achieved after the speed change, when the engine speed is changed substantially to a target speed to be achieved after the speed change.

9 Claims, 7 Drawing Sheets

(51) Int. Cl.
*B60W 10/06* (2006.01)
*B60W 20/10* (2016.01)
*B60K 6/445* (2007.10)
*F02D 29/02* (2006.01)
*B60K 6/547* (2007.10)
*B60W 30/19* (2012.01)

(52) U.S. Cl.
CPC ............ *B60W 10/08* (2013.01); *B60W 20/00* (2013.01); *B60W 30/19* (2013.01); *F02D 29/02* (2013.01); *B60W 2710/0644* (2013.01); *Y02T 10/6239* (2013.01); *Y02T 10/7258* (2013.01); *Y10S 903/93* (2013.01)

(58) Field of Classification Search
CPC ........... B60W 2710/0644; B60K 6/547; B60K 6/445; F02D 29/02; Y02T 10/7258; Y02T 10/6239; Y10S 903/93
USPC .......................................................... 701/22
See application file for complete search history.

(56) References Cited

U.S. PATENT DOCUMENTS

| | | | |
|---|---|---|---|
| 2003/0075145 A1* | 4/2003 | Sheidler | F02D 31/007 123/396 |
| 2008/0099259 A1* | 5/2008 | Tomo | B60K 6/445 180/65.265 |
| 2008/0195286 A1 | 8/2008 | Tabata et al. | |
| 2008/0300761 A1* | 12/2008 | Matsubara | B60K 6/445 701/61 |

FOREIGN PATENT DOCUMENTS

| | | |
|---|---|---|
| JP | 2006-063865 A | 3/2006 |
| JP | 2008-179291 A | 8/2008 |
| JP | 2008195303 A | 8/2008 |
| JP | 2010274855 A | 12/2010 |
| JP | 2011-037400 A | 2/2011 |
| JP | 2011-105240 A | 6/2011 |
| JP | 2011245892 A | 12/2011 |

* cited by examiner

SPEED CHANGE CONTROL SYSTEM AND SPEED CHANGE CONTROL METHOD FOR HYBRID VEHICLE

CROSS REFERENCE TO RELATED APPLICATIONS

This application is a National Stage of International Application No. PCT/JP2012/052748, filed Feb. 7, 2012, the contents of all of which are incorporated herein by reference in their entirety.

TECHNICAL FIELD

The present invention relates to a control system for a hybrid vehicle in which a prime mover is comprised of an internal combustion engine and a motor. More specifically, the present invention relates to a control system and method for controlling an operation of changing a speed of the engine stepwise, which is applied to a hybrid vehicle comprised of a first motor mainly controlling a speed of the engine, and a second motor mainly assisting a drive torque for propelling the vehicle.

BACKGROUND ART

In a two-motor type hybrid vehicle or a hybrid drive unit, a power of an internal combustion engine (i.e., an engine) is distributed by a power distribution device composed mainly of a differential mechanism to the first motor having a generating function and to an output member, and an electric power generated by the first motor is delivered to the second motor connected with the output member to operate the second motor. Thus, in the two-motor type hybrid vehicle, the mechanical power of the engine is partially delivered to the output member through the power distribution mechanism, and the remaining power of the engine is once converted into an electric power and then converted into the mechanical power again to be delivered to the output member. Therefore, an engine speed can be controlled arbitrarily by the first motor while keeping a drive torque to achieve a required acceleration etc. so that the engine is allowed to be operated at an operating point of optimizing fuel efficiency.

Such advantage is realized by changing the engine speed continuously by the first motor, therefore, the speed ratio of the two-motor type hybrid vehicle is changed substantially continuously as a vehicle having a continuously variable transmission. However, in order to enhance an agility of the vehicle, the drive torque or an engine braking force has to be increased while maintaining the substantial speed ratio. To this end, the engine speed of the conventional hybrid vehicle has been changed stepwise. In order to realize such engine speed control or speed ratio control, a region where the speed ratio is maintained, and a region where the engine speed is changed with a change in a vehicle speed are determined in advance for different driving conditions represented by the vehicle speed or an opening degree of an accelerator. In the conventional hybrid vehicle, therefore, a target engine speed (i.e., a speed ratio) is changed as the driving condition enters into the above-explained region or the driving condition is changed beyond the above-explained region. Otherwise, the target engine speed (i.e., the speed ratio) is changed as a speed ratio is changed by a manual operation.

In the above-explained hybrid vehicle, the engine speed is basically controlled by the first motor. That is, the first motor is required to establish a large positive or negative torque to change the engine speed stepwise in response to a speed change demand. For this purpose, an electric storage device such as a battery has to discharge an electric power, and charged with the electric power. However, such charging and discharging of the storage device may be restricted depending on the condition. In addition, an inertia torque is generated in accordance with an inertia moment as a result of changing the engine speed, and such inertia torque may become load on the storage device and may cause a control delay.

In the prior art, various kinds of devices for preventing an over discharge and an overcharge of the electric storage device used in the hybrid vehicle have been proposed. Also, various kinds of devices for controlling the speed ratio and the engine speed taking into account the inertia torque of the engine have been proposed. For example, Japanese Patent Laid-Open No. 2008-179291 describes a power output device adapted to quickly execute a upshifting manually in the two-motor type hybrid vehicle. As described, the engine speed is controlled by a generator, and a torque of the generator has to be increased to lower the engine speed quickly or stepwise. However, the torque of the generator may be limited depending on a charging capacity of the electric storage device. According to the teachings of Japanese Patent Laid-Open No. 2008-179291, therefore, a required power for the engine is limited in accordance with inertia energy resulting from lowering the engine speed.

When changing the engine speed, a torque is generated or required according to the inertia moment. Therefore, the device taught by Japanese Patent Laid-Open No. 2008-179291 carries out the controls taking into account the inertia energy. Likewise, Japanese Patent Laid-Open No. 2011-37400 describes a method for controlling a motor torque taking account of an inertia torque of the engine, in the process of stopping the engine by stopping a fuel injection to the engine. When the generator is activated to stop a rotation of the engine, the torque of the generator is added to the driving torque for propelling the vehicle more than a little. According to the teachings of Japanese Patent Laid-Open No. 2011-37400, therefore, a torque obtained by subtracting a torque of the generator for stopping the engine from a request torque requested in travel is outputted from a motor connected with an output shaft. In addition, the inertia torque is generated when lowering the engine speed to stop the engine. According to the teachings of Japanese Patent Laid-Open No. 2011-37400, moreover, a torque obtained by subtracting the inertia torque of the engine and the torque of the generator is outputted by the motor after the lapse of the predetermined time.

If a response delay during changing the engine speed is compensated by the motor, a generation amount of the motor is increased and this may cause an overcharging of a battery. Otherwise, an over discharging may be induced to increase the motor torque. In order to prevent such disadvantages, in a hybrid vehicle described in Japanese Patent Laid-Open No. 2011-105240, a target drive power is calculated based on an accelerator opening degree and a vehicle speed obtained preset time earlier, and a target motor generator power is calculated based on the target drive power thus calculated.

Japanese Patent Laid-Open No. 2005-315084 also describes a control example to deal with the response delay during changing the engine speed or an engine output. According to the teachings of Japanese Patent Laid-Open No. 2005-315084, a timing to start a downshifting for establishing an engine braking force is accelerated taking into consideration a delay in controls of an engine and an engagement of a clutch.

Meanwhile, Japanese Patent Laid-Open No. 2006-63865 describes another power output device configured to estimate an engine torque while changing a response speed of the control in accordance with an engine speed.

In turn, Japanese Patent Laid-Open No. 2000-87774 describes a power output apparatus and a control method for a hybrid vehicle. According to the teachings of Japanese Patent Laid-Open No. 2000-87774, an operation line lower in torque than the maximum torque line is adapted as a reference operation line. When an abrupt acceleration is required, the engine torque is increased to the maximum torque line, and then an engine speed is increased to a speed at an intersection of the operating line in a steady state and the equivalent output line of the abrupt acceleration.

As described in Japanese Patent Laid-Open No. 2008-179291, the power generation amount may be reduced by lowering the engine output during lowering the engine speed while taking account of the inertia energy of the engine so as to reduce the torque to be established by the generator. However, it may take time to consume the inertia energy resulting from lowering the engine speed. Therefore, a reduction in the engine speed, that is, the speed change operation may be delayed.

According to the teachings of Japanese Patent Laid-Open No. 2011-37400, the motor torque is controlled taking account of the inertia torque of the engine so that the drive torque is stabilized in the process of stopping the engine. However, according to the method taught by Japanese Patent Laid-Open No. 2011-37400, the motor torque is controlled only until the inertia torque resulting from changing the engine speed disappears. That is, a length of time until a disappearance of the inertia torque cannot be shortened. Therefore, the reduction in the engine speed, that is, the speed change operation may also be delayed.

In turn, according to the teachings of Japanese Patent Laid-Open No. 2011-105240, the target drive power obtained based on the values of preset time earlier is used. Therefore, it is unnecessary to increase the generation amount when an accelerator pedal is returned to cutoff power so that the vehicle speed and the engine speed are lowered. However, in the hybrid vehicle taught by Japanese Patent Laid-Open No. 2011-105240, the engine speed is not lowered aggressively. This means that the control response to change the engine speed may not be improved. Such technical problem may also not be solved by the teachings of Japanese Patent Laid-Opens Nos. 2005-315084 and 2006-63865.

According to the teachings of Japanese Patent Laid-Open No. 2000-87774, the engine speed is changed continuously to control the engine torque when an abrupt acceleration is required. Specifically, the engine torque is increased first of all, and then, the engine speed is changed along the equivalent output line for the case that the abrupt acceleration is required. Therefore, an increase in the engine speed is delayed inevitably. In addition, since the control is carried out without taking into consideration the inertia moment of the engine, the response delay may be worsened when changing the engine speed stepwise by a manual operation.

DISCLOSURE OF THE INVENTION

An object of the present invention is to provide a speed change control system for a two-motor type hybrid vehicle, which is configured to improve a control response for changing a target engine speed stepwise, without causing an overcharging and an over discharging, while reducing shocks.

The speed change control system of the present invention is applied to a hybrid vehicle comprised of a first motor having at least any of an electric generating function and a torque generating function, a differential mechanism that distributes a power of an internal combustion engine to the first motor and to an output member and that changes a speed of the internal combustion engine in accordance with a speed of the first motor, and a second motor that has at least any of an electric generating function and a torque generating function and that exchanges a torque with any of wheels. In order to achieve the above-explained objectives, the speed change control system of the present invention is comprised of: a first power control means that outputs a command for changing a power of the internal combustion engine in a direction to expedite a change in a speed of the internal combustion engine, at the beginning of a speed change operation for changing the speed of the internal combustion engine stepwise; a first speed control means that continues controls of the first and the second motors as before the speed change operation, during a period from a point at which the first power control means outputs the command for changing the power of the internal combustion engine to a point at which a time corresponding to a response delay of the internal combustion engine elapses; a second speed control means that controls the first motor in a manner such that the speed of the internal combustion engine is changed in a direction to be changed by the change in the power of the internal combustion engine, after a lapse of the time corresponding to the response delay of the internal combustion engine; and a second power control means that outputs a command for changing the power of the internal combustion engine to a power to be achieved after the speed change operation, when the speed of the internal combustion engine is changed substantially to a target speed to be achieved after the speed change operation.

The first power control means includes a means that outputs a command for lowering the power of the internal combustion engine when carrying out an upshifting for lowering the speed of the internal combustion engine stepwise, the second speed control means includes a means that consumes an electric power generated by the first motor as a result of lowering the speed of the internal combustion engine after the lapse of the time corresponding to the response delay of the internal combustion engine, by delivering the electric power to the second motor thereby operating the second motor to output a torque to the output member, and the second power control means includes a means that outputs a command for increasing the power of the internal combustion engine to the power to be achieved after the speed change operation, when the speed of the internal combustion engine is changed substantially to the target speed after the speed change operation.

Specifically, the first power control means is configured to output a command for the internal combustion engine to output a power achieved by subtracting a power corresponding to an inertia torque resulting from changing the speed of the internal combustion engine from the power to be achieved after the upshifting.

In order to carry out the upshifting, the second power control means is configured to output the command for increasing the power of the internal combustion engine at a timing when the speed of the internal combustion engine is not lowered to be lower than a target speed to be achieved after the speed change operation due to a response delay until the power of the internal combustion engine is changed actually. In addition, the second speed control means includes a means that controls the first motor to lower the speed of the internal combustion engine at a lowering rate as before the second power control means outputs the command for increasing the power of the internal combustion engine, during a period from a point at which the second power control means outputted the command to a period at which the time corresponding to the response delay of the internal combustion engine elapsed.

In order to carry out the upshifting, more specifically, the second speed control means is configured to decrease the lowering rate of the speed of the internal combustion engine after the time corresponding to the response delay of the internal combustion engine has elapsed from the point at which the command for increasing the power of the internal combustion engine was outputted. In addition, the second power control means is configured to lower the torque of the second motor toward the target torque to be achieved after the speed change operation when the command for increasing the power of the internal combustion engine is outputted.

According to another aspect of the present invention, the first power control means includes a means that outputs a command for increasing the power of the internal combustion engine when carrying out a downshifting for increasing the speed of the internal combustion engine stepwise while regenerating energy by the second motor. In this example, the second speed control means includes a means that consumes an electric power generated by regenerating energy by the second motor after the lapse of the time corresponding to the response delay of the internal combustion engine, by delivering the electric power to the first motor thereby increasing the speed of the internal combustion engine by a torque generated by the first motor. In addition, the second power control means includes a means that outputs a command for lowering the power of the internal combustion engine to the power to be achieved after the speed change operation, when the speed of the internal combustion engine is changed substantially to the target speed to be achieved after the speed change operation.

In this example, the first power control means may be configured to output a command for the internal combustion engine to output a power achieved by adding a power corresponding to an inertia torque resulting from changing the speed of the internal combustion engine to the power to be achieved after the downshifting.

In case of downshifting, the second power control means terminates an increment of the power of the internal combustion engine by the first power control means.

In addition, the second speed control means includes a means that decreases a gradient to change the speed of the internal combustion engine after the second power control means outputs the command to change the power of the internal combustion engine to the power to be achieved after the speed change operation, to the gradient smaller than that before the second power control means outputs the command.

According to still another aspect of the present invention, there is provided a speed change control method using the foregoing speed change control system.

Thus, according to the speed change control system or method of the present invention, if the power of the internal combustion engine has not yet been changed due to the response delay after outputting the command for changing the power of the internal combustion engine, prior controls of the motors are continued as before the speed change operation. Therefore, an overloads of any of motors will not be caused so that an overcharging or an over discharging of an electric storage device is avoided. Specifically, when the engine speed starts changing in response to the command, the first motor is controlled in a manner such that the engine speed is changed toward the speed to be achieved after the speed change. In this situation, the electric power is exchanged between the first and the second motors so that the electric balance is maintained. In addition, the engine speed is changed by changing the engine power and by controlling the first motor. The engine speed is allowed to be changed smoothly and promptly without producing any uncomfortable feeling. Further a time required for the speed change operation can be shortened.

BEST MODE FOR CARRYING OUT THE INVENTION

Figure 9:
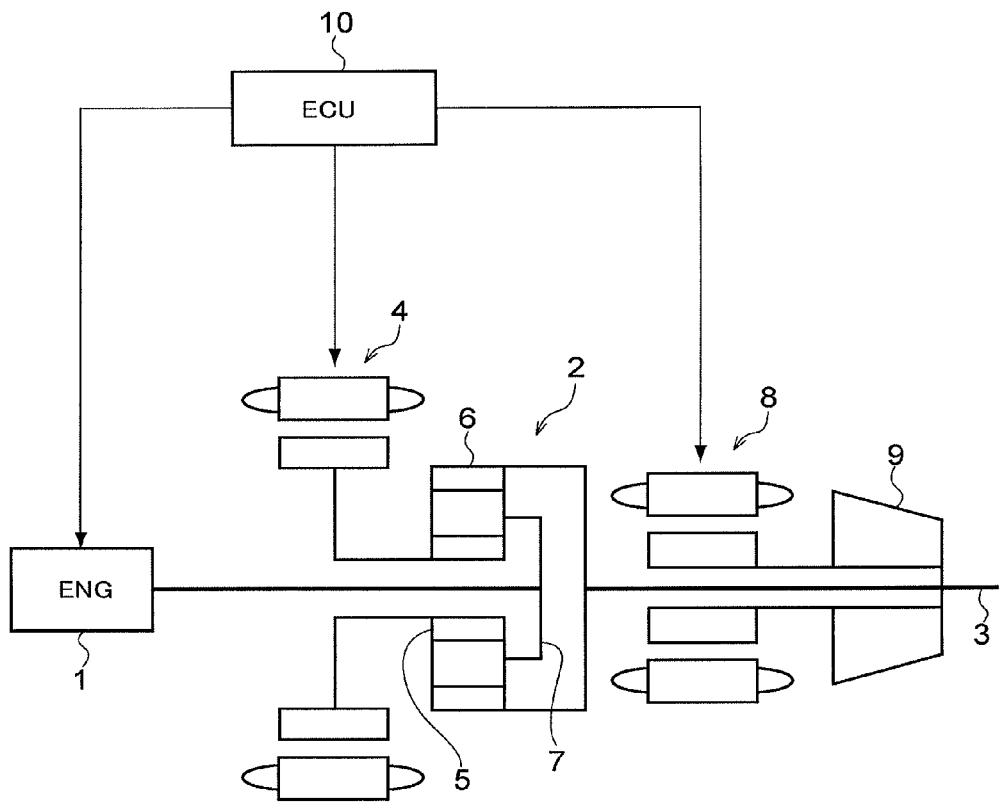
FIG. 9 is a view schematically showing one example of the two-motor type hybrid vehicle to which the present invention is applied.

The hybrid vehicle or a drive unit thereof to which the present invention is applied is provided with a device for changing an engine speed or a substantial speed ratio continuously, and the speed change control system and method of the present invention are configured to change the engine speed or the substantial speed ratio stepwise. Referring now to the accompanying figures, a power train of the hybrid vehicle will be explained first of all with reference to FIG. 9. In FIG. 9, there is shown an example of a two-motor type hybrid drive unit, and a power of an engine (ENG) 1 is distributed to an output shaft 3 side and to a first motor-generator (MG1) 2 side through a power distribution device 2. An internal combustion engine such as a gasoline engine and a diesel engine may be used as the engine 1, and an output element of the engine 1 such as a crankshaft is connected with the power distribution device 2. In the example shown in FIG. 9, a single-pinion type planetary gear unit is used as the power distribution device 2. The power distribution device 2 is comprised of a sun gear 5, a ring gear 6 arranged concentrically with the sun gear 5, a pinion gear(s) interposed between the sun gear 5 and the ring gear 6 while meshing therewith, and a carrier 7 supporting the pinion gear(s) in a manner such that the pinion gear(s) is/are allowed to rotate and revolve around the sun gear 5. The carrier 7 is connected with the engine 1 to serve as an input element, the sun gear 5 is connected with a first motor-generator 4 to serve as a reaction element, and the ring gear 6 is connected with the output shaft 3 to serve as an output element.

The output shaft 3 is also connected with a second motor-generator (MG2) 8 through a transmission 9 adapted to transmit a torque of the second motor-generator 8 to the output shaft 3 while increasing or decreasing. To this end, a speed ratio of the transmission 9 may be not only fixed to a predetermined ratio but also shifted among a plurality of ratios.

In this preferred example, a permanent magnet synchronous motor is individually used as the motor-generators 4, 8. Therefore, each motor-generator 4, 8 is not only allowed to serve as a motor to generate a torque by energizing a coil thereof, but also allowed to serve as a generator to generate an electric power by compulsory rotating a rotor thereof. Those motor-generators 4 and 8 are electrically connected with a not shown electric storage device such as an inverter so that the electric power generated by one of the motor-generators is delivered to the other motor-generator. An electronic control unit (abbreviated as ECU) 10 composed mainly of a microprocessor is connected with the engine 1 and the motor-generators 4 and 8. Therefore, a speed, a torque and a generation amount of each motor-generator 4, 8, and an output of the engine 1 and so on are controlled by the ECU 10. In addition, an air-intake, an amount of fuel supply, an injection timing of the engine 1 are controlled electrically so as to control a torque and a speed thereof electrically.

Figure 10:
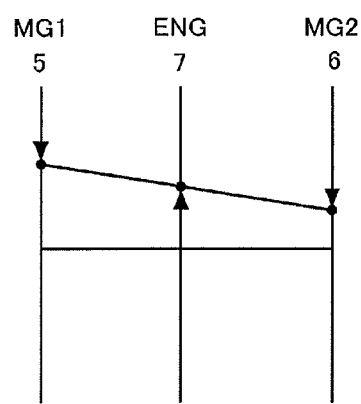
FIG. 10 is a nomographic diagram of the power distribution device.

FIG. 10 is a nomographic diagram of the planetary gear mechanism serving as the power distribution device 2. Under normal hybrid mode, the power of the engine is distributed to the output shaft 3 side and to the first motor-generator 4 side. Therefore, the first motor-generator 4 is rotated to serve as a generator, and a torque resulting from the generation acts on the sun gear 5 as a reaction torque. Consequently, the engine torque will appear on the ring gear 6 as the output element while being amplified. In this situation, the second motor-generator 8 is driven by the electric power generated by the first motor-generator 4 to serve as a motor, and an output torque of the second motor-generator 8 is delivered to the output shaft 3 through the transmission 9. That is, the power of the engine 1 is partially delivered to the output shaft 3 through the power distribution device 2, and the remaining power of the engine 1 is once converted into an electric power and then converted into a mechanical power again to be delivered to the output shaft 3.

Thus, the control system of the present invention is applied to the hybrid vehicle or drive unit comprised of the motor for controlling the engine speed and another motor for assisting or reducing the drive torque for the vehicle while exchanging the electric power with said motor. Accordingly, in order to adjust the drive torque, the example shown in FIG. 9 may be modified to connect the second motor-generator 8 and the transmission 9 with wheels other than wheels rotated by the power from the engine 1, instead of connecting the second motor-generator 8 and the transmission 9 with the output shaft 3.

The controls of the engine 1, the first motor-generator 4 and the second motor-generator 8 will be explained in more detail. Under the normal hybrid mode emphasizing the fuel economy, a required drive force is calculated based on a drive demand represented by an opening degree of an accelerator and a vehicle speed. As known in the conventional art, such calculation is executed with reference to a preinstalled map. Then, a required power (i.e., a target power) of the engine 1 is calculated based on the calculated required drive force and the vehicle speed. The power of the engine can be expressed as a product of the engine torque and the engine speed, and the engine speed is determined in a manner such that the engine 1 is operated at an optimal fuel efficient point. To this end, the fuel efficiency at each operating point is measured and preinstalled in the form of a map so that the engine speed to optimize the fuel efficiency is determined with reference to the map. As described, the speed of the engine 1 can be controlled by the first motor-generator 4. Therefore, for example, the engine speed can be controlled to optimize the fuel efficiency by operating the first motor-generator 4 as a generator, and applying a torque of the first-motor generator 4 to the engine 1 as a reaction torque. Since the target speed of the engine 1 has already been calculated, such control can be realized by carrying out a feedback control of a speed of the first-motor generator 4.

Then, a target torque is calculated based on the calculated target power and target speed of the engine 1. As can be seen from the nomographic diagram shown in FIG. 10, when the first-motor generator 4 is operated as a generator, the engine torque is amplified by the torque of the first-motor generator 4 and delivered to the output shaft 3. In this situation, the second motor-generator 8 is operated by the electric power generated by the first-motor generator 4, and a torque of the second motor-generator 8 can be calculated by subtracting a torque of the engine 1 delivered to the output shaft 3 from the target drive torque for propelling the vehicle. Accordingly, the motor-generators 4 and 8 are controlled by the ECU 10 in a manner to generate the torques thus calculated.

Thus, in the hybrid vehicle, the target speed of the engine is changed continuously in accordance with the drive demand and the vehicle speed, and the engine speed is controlled by the first-motor generator 4. Therefore, it is possible to change the engine speed stepwise as in a vehicle having a geared transmission. Such an operating mode (i.e., a driving mode) is known in the conventional art. For this purpose, a plurality of speed ratio regions or gear stages is preinstalled in the ECU 10 in the form of map, and the speed ratio region or gear stage is selected in accordance with the drive demand such as an opening degree of the accelerator. The speed ratio region or gear stage may also be selected by a manual operation. Then, the target engine speed is determined using an arithmetic expression or a map prepared for each speed ratio region or gear stage.

Figure 1:
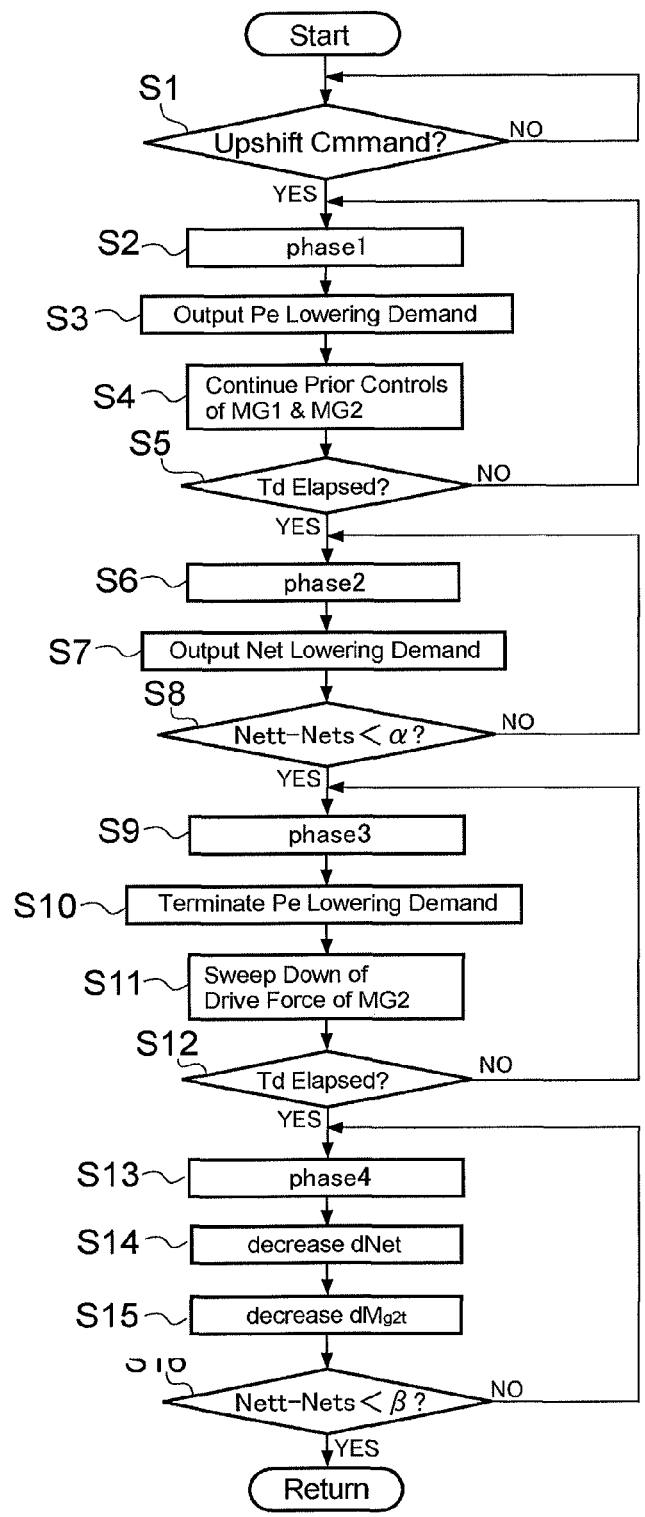
FIG. 1 is a flowchart showing one example of an upshift control carried out by the speed change control system of the present invention.

When changing the engine speed stepwise, a response of the engine 1 to the control is delayed inevitably, and an inertia torque is increased with an increase in an angular acceleration of the engine 1. In order to avoid an overcharging and an over discharging by reducing a load on the motor-generators 4 and 8, and to reduce shift shocks while improving a speed change response, the speed change control system of the present invention executes following controls. FIG. 1 is a flowchart showing an example of upshifting for lowering the engine speed stepwise. If an upshift command is outputted so that the answer of step S1 is YES, a "phase 1" flag of upshifting is set (at step S2). This flag as well as the after-mentioned flags are also used in other controls related to the control shown in FIG. 1. Specifically, the upshift command is outputted when the driving condition of the vehicle such as an opening degree of the accelerator and a vehicle speed enter into the predetermined speed ratio region of high speed side from the speed ratio region of low speed side. Otherwise, the upshift command is outputted when an upshifting operation of a not shown shifting device is executed manually. By contrast, if the upshift command is not outputted so that the answer of step S1 is NO, the routine is returned without carrying out any specific control.

After carrying out the control of step S2, a demand to lower an engine power Pe is outputted (at step S3). Here, a target value of the engine power Pe to be lowered can be calculated by subtracting an inertial energy (i.e., an inertia torque) to be released by lowering the engine speed from an engine power to be achieved after the upshifting.

After the upshifting, for example, an accelerator pedal (not shown) is returned to decrease the opening degree thereof, and consequently the driving condition enters into the speed ratio region of high speed side. Accordingly, after the upshifting, the engine power is generated in accordance with the opening degree of the accelerator thus decreased. Then, the engine power is further lowered in accordance with the inertia torque released from the engine 1 as a result of the reduction in the engine speed after the upshifting. Accordingly, the engine power after the upshifting can be calculated based on the inertia moment of the engine 1 and the angular acceleration such as a changing gradient of the engine speed.

The engine power Pe can be lowered by a conventional method in response to a demand (i.e., a command) to lower the engine power Pe. For example, the engine power Pe can be lowered by reducing a fuel supply (or a fuel injection). Alternatively, if a gasoline engine is used, the engine power Pe may also be lowered by delaying an ignition timing. Otherwise, the engine power Pe may also be lowered by reducing an air intake by narrowing an opening degree of the throttle valve. However, if the engine power Pe is lowered by stopping or reducing the fuel supply, or by delaying the injection timing, exhaust gas may become worse. In contrast, if the engine power Pe is lowered by narrowing the opening degree of the throttle valve, although a response delay to lower the engine power may be increased in comparison with that of the case of reducing the fuel supply or delaying the injection timing, the exhaust gas will not become worse.

In any of those cases, a timing at which the engine power starts lowering is delayed inevitably from a timing at which the command signal for lowering the engine power is outputted. For example, such response delay is caused by a fact that the inertia moment of the engine 1 is large, and that the air intake is not reduced immediately. Accordingly, a response delay time (i.e., a dead time) Td may differ depending on a capacity and a speed of the engine 1, the kind of a means for lowering the power, and so on. However, a length of the response delay time Td may be measured in advance.

Thus, even if the demand to lower the engine power Pe is outputted at step S3, the engine power will not be lowered immediately. Therefore, the second motor-generator 8 controlling the drive torque for propelling the vehicle and the first motor-generator 4 are controlled by the same way as before the upshift command was outputted (at step S4). As described, the hybrid vehicle may be controlled as the vehicle having the geared transmission. In this case, a target speed Net of the engine is determined in a manner such that the engine speed is changed in accordance with the vehicle speed and the opening degree of the accelerator (i.e., the drive demand) in each speed ratio region. To this end, a relation of the vehicle speed or the drive demand to the engine speed may be determined arbitrarily. Therefore, such relation may not only be differentiated in each speed ratio region, but also be assimilated in any of the speed ratio regions. Such relation is preinstalled in the ECU 10 in the form of a map or an arithmetic expression for each speed ratio region. That is, at step S4, prior controls of the first motor-generator 4 and the second motor-generator 8 are continued. Specifically, the relation of the vehicle speed or the drive demand to the engine speed is maintained to the relation determined for the speed ratio region of low speed side, or the target engine speed Net is maintained to the prior value, as before a judgment of the upshifting was satisfied. More specifically, a target drive force of the second motor-generator 8 is continuously controlled in such a manner that the driving condition is in the speed ratio region of low speed side, as before the upshifting. In this situation, if the opening degree of the accelerator is changed during the dead time Td, the target drive force of the second motor-generator 8 (i.e., the target drive force of the vehicle) can be changed in accordance with the change in the opening degree of the accelerator.

Accordingly, the engine speed Ne will not be lowered compulsory by the first motor-generator 4 immediately after outputting the upshift command, that is, during the response delay time Td. Therefore, a generation amount of the first motor-generator 4 will not be increased. In addition, since the motor-generators 4 and 8 are controlled as before the satisfaction of judgment of upshifting, the electric power generated by the first motor-generator 4 is consumed by the second motor-generator 8. Therefore, a balance of electric power between those motor-generators will not be changed so that the overcharging and the over discharging are prevented.

After carrying out the control of step S4, then it is determined whether or not the response delay time Td of the engine 1 has elapsed (at step S5). As described, a length of the response delay time Td is measured in advance. Therefore, if a period from the point at which the upshift command was outputted has reached the response delay time Td, it is determined at step S5 that the response delay time Td has elapsed. If the answer of step S5 is YES, a "phase 2" flag of upshifting is set (at step S6). In contrast, if the answer of step S5 is NO, the routine is returned to step S2 to continue the controls of steps S3 and S4.

During the phase 2 of upshifting after the lapse of the response delay time Td of the engine 1, the power of the engine 1 and the engine speed Ne start lowering. Therefore, under the phase 2, a demand to lower a target engine speed Net (i.e., a lowering command) is outputted (at step S7). The target engine speed Net after the upshifting can be determined in advance based on the vehicle speed and the opening degree of the accelerator. That is, the target engine speed Net may also be called a steady target speed Nets. At step S7, specifically, a transitional target speed Nett of the engine 1 during lowering the engine speed toward the steady target speed Nets is lowered gradually. The purpose of setting the transitional target speed Nett is to change the engine speed without producing any uncomfortable feeling resulting from shocks caused by the inertia torque, or by an abrupt change or a slow change in the engine speed. To this end, as known in the conventional art, the transitional target speed Nett is determined by applying a rounding process or a first order lagging process to the steady target speed Nets. Accordingly, the torque or the speed of the first motor-generator 4 is controlled in a manner such that the engine speed Ne is changed to achieve the transitional target speed Nett. As a result, the actual engine speed Ne is lowered gradually at a gradient (i.e., a change rate) dNet determined by a rounding coefficient or a first order lag coefficient governing the transitional target speed Nett.

After the lapse of the delay time or dead time Td, the output torque of the engine 1 under control (i.e., an indicated torque) starts lowering. However, an inertia torque is generated as a result of a reduction in the engine speed. Here, as described, a reduction amount in the power of the engine 1 is calculated taking account of the inertia torque, or corresponds to the inertia torque. Therefore, even if the indicated torque of the engine 1 is lowered, the output torque of the engine 1 is maintained to the prior value without being lowered. During lowering the engine speed, the first motor-generator 4 generates an electric power, and the generated electric power is supplied to the second motor-generator 8 to be consumed by the second motor-generator 8. In this situation, the target drive force of the second motor-generator 8 previously set in the speed ratio region of the low speed side before the upshifting is continuously used. That is, both motor-generators 4 and 8 generate the electric powers, and an electric consumption is maintained substantially evenly. Therefore, the electric balance will not be deteriorated.

Then, it is determined whether or not a difference between the transitional target speed Nett and the steady target speed Nets becomes smaller than a reference value α (at step S8). As described, the feedback control of the first motor-generator 4 is carried out to lower the engine speed Ne gradually at the predetermined gradient dNet, but the reduction in the engine speed Ne is delayed inevitably. Therefore, in order not to lower the engine speed Ne lower than the steady target speed Nets, that is, in order not to cause an undershoot, a timing to terminate the control of lowering the engine power Pe and the engine speed Ne is accelerated. To this end, the reference value α is used to determine whether or not to accelerate the termination. Specifically, the reference value α is determined based on an experimental result taking account of the response delay times of the engine 1 and the first motor-generator 4, an eventual changing condition of the drive torque, an existence of shocks or a magnitude thereof etc.

If the transitional target speed Nett has not yet been lowered sufficiently so that the answer of step S8 is NO, the routine is returned to step S6 to continue to output the demand to lower the target engine speed Net (i.e., the lowering command). By contrast, if the answer of step S8 is YES, a "phase 3" flag of upshifting is set (at step S9), and the control to output the demand to lower the engine power Pe (i.e., the lowering command) is terminated (at step S10). As described, the control to output the demand for lowering the engine power Pe is commenced at step S3, so as to subtract the power corresponding to the inertia torque generated as a result of lowering the engine speed from the engine power to be achieved after the upshifting. At step S10, therefore, the control for reducing the engine power in the amount of the inertia torque is terminated. That is, the target value of the engine power Pe is achieved after the termination of the upshifting. More specifically, an opening degree of the throttle valve with respect to an opening degree of the accelerator is adjusted to achieve the target value of the engine power Pe after the upshifting.

As the case of lowering the engine power Pe at step 3, although a demand value (i.e., a command value) for lowering the engine power Pe is changed stepwise, the indicated torque of the engine 1 and the actual torque will not be lowered immediately due to the response delay. However, the drive torque established by the engine 1 will be lowered eventually. Therefore, in order to prevent an abrupt change in the drive force and resultant shocks at the end of reduction, the target drive force of the second motor-generator 8 (i.e., the transitional target drive force) is lowered gradually at a predetermined gradient (i.e., a change rate) (at step S11).

Then, it is determined whether or not the elapsed time from the point at which the lowering demand of the engine power Pe was outputted at step S10 reaches the response delay time Td of the engine 1 (at step S12). The response delay time Td is determined in advance based on a result of an experimentation or simulation. Alternatively, the response delay time Td may also be determined with respect to a driving condition of the vehicle such as en engine speed with reference to a preinstalled map. If the response delay time Td has not yet elapsed so that the answer of step S12 is NO, the routine is returned to step S9 to continue the controls of steps S10 and S11. In contrast, If the response delay time Td has already elapsed so that the answer of step S12 is YES, a "phase 4" flag of upshifting is set (at step S13). During the phase 4, in order not to lower the engine speed Ne lower than the steady target speed Nets (i.e., to prevent an undershoot), the gradient dNet for lowering the transitional target speed Nett of the engine 1 is decreased (at step S14). To this end, the lowering gradient dNet may be determined based on a result of an experimentation or simulation. As a result of thus decreasing the gradient dNet for lowering the transitional target speed Nett of the engine speed Ne, a generation amount of the first motor-generator 4 is reduced. Therefore, a lowering gradient dMg2t for the target drive force, that is, for the target output of the second motor-generator 8 is determined in accordance with a reduction in the lowering gradient of the transitional target speed Nett (at step S15). That is, the transitional target speed Nett is controlled without deteriorating the electric balance and without changing the drive torque abruptly.

Then, it is determined whether or not a difference between the transitional target speed Nett thus lowered and the steady target speed Nets becomes smaller than a reference value β (at step S16). That is, a termination of the upshifting is judged at step S16, and for this purpose, the reference value β is set to a small value, e.g., to almost zero. If the transitional target speed Nett is still large and not yet reduced close enough to the steady target speed Nets so that the answer of step S8 is NO, the routine is returned to step S13 to continue the controls for the phase 4. Specifically, the control of lowering the transitional target speed Nett of the engine 1 at the decreased lowering gradient is continued, and the control of lowering the transitional target drive force gradually to the steady target drive force after the speed change is continued. In contrast, if the engine speed Ne is substantially lowered to the steady target speed Nets as the target speed to be achieved after the speed change so that the answer of step S16 is YES, the upshifting is terminated and the routine is returned to terminate the control shown in FIG. 1. That is, each flag is reset, the control of lowering the target engine speed Net is terminated, and the target engine speed is determined based on the drive demand such as an opening degree of the accelerator and a vehicle speed.

Figure 2:
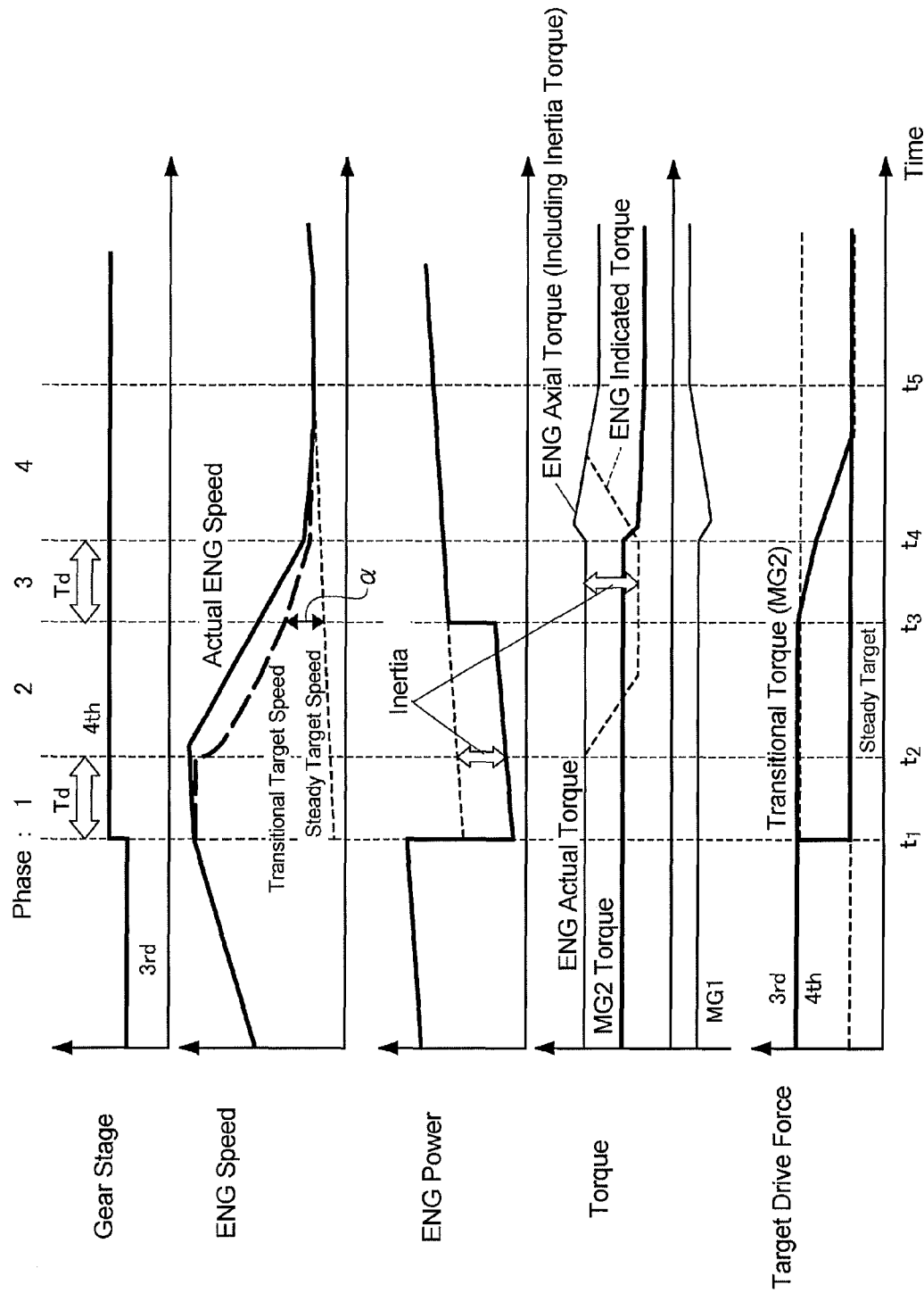
FIG. 2 is a time chart indicating an example of changing a target engine speed, a target engine power, torques of an engine and a second motor-generator and a target drive force of a hybrid vehicle under the control shown in FIG. 1.

As described, the present invention is applied to the two-motor type hybrid vehicle in which the engine speed or the substantial speed ratio can be changed stepwise. FIG. 2 is a time chart showing an example of changes in the target engine speed, the target engine power, the torques of the engine 1 and the second motor-generator 8, and the target drive force of the hybrid vehicle thus structured, under the situation that the gear stage is shifted from the third stage to the fourth stage by the control shown in FIG. 1. Provided that the accelerator pedal is depressed so that the engine speed and the engine power are being increased under the third stage, when the engine speed or the vehicle speed is increased to a certain extent and the accelerator pedal is returned at a predetermined degree, the gear stage determined with reference to the map based on the vehicle speed and the opening degree of the accelerator is shifted to the fourth stage. Consequently, a judgment to carry out an upshifting to the fourth stage is satisfied (at point t1). Accordingly, the control of phase 1 is commenced at the time point t1. Specifically, the steady target speed Nets of the engine 1 is lowered to the speed for the fourth stage, and the target drive force is lowered to the steady target value for the fourth speed.

At the same time, the target engine power is lowered from the steady target power for the fourth stage established in response to the judgment satisfied based on the fact that the accelerator pedal was returned, to the target value calculated by subtracting the power corresponding to the inertia torque resulting from lowering the engine speed. At the time point t1, the control for lowering the engine speed compulsory by the first motor-generator 4 is not carried out so that the first motor-generator 4 is controlled in a same manner as under the third stage. Therefore, the second motor-generator 8 to which the electric power is supplied from the first motor-generator 4 is also controlled in a same manner as under the third stage. That is, since the transitional target drive force of the second motor-generator 8 is thus controlled in a same manner as under the third stage, the target drive force of entirely of the vehicle is maintained to the drive force under the third stage. In this situation, if the opening degree of the accelerator is changed, the transitional target drive force will be changed in accordance with the controls for the third stage.

After a lapse of the response delay time (i.e., the dead time) Td of the engine 1 (at point t2), the controls for the phase 2 are commenced. Specifically, the control for lowering the target engine power (e.g., a control for reducing the opening degree of the throttle valve) is carried out so that the engine power starts lowering from the time point t2 as indicated by a broken line in FIG. 2. At the time point t2, the control for lowering the engine speed Ne is also commenced. Specifically, as described, the transitional target speed Nett is determined by applying the rounding process or the first order lagging process to the steady target speed Nets, and the first motor-generator 4 is controlled in a manner such that the engine speed Ne is changed while following the transitional target speed Nett. In the example shown in FIG. 2, the first motor-generator 4 functions as a generator and the torque to generate the electric power is used to lower the engine speed. In this situation, however, the target power of the engine 1 is lowered so that the speed of the engine 1 is reduced. Therefore, the generation amount of the first motor-generator 4 will not be especially increased, and the electric power generated by the first motor-generator 4 is supplied to the second motor-generator 8. Consequently, the electric power generated by the first motor-generator 4 is consumed to generate the drive force by the second motor-generator 8. For this reason, the electric balance will not be deteriorated. In other words, an over-charging and an over discharging of the electric storage device (not shown) connected with the motor-generators 4 and 8 can be avoided. In addition, the engine speed can be lowered smoothly and promptly toward the target value.

Then, when the transitional target speed Nett is lowered so that the difference between the transitional target speed Nett and the steady target speed Nets becomes smaller than a reference value α (at point t3), the controls for the phase 3 are commenced, that is, the control for lowering the target engine power is terminated. In the example shown in FIG. 2, specifically, the target engine power that has been lowered with respect to the steady target power for the fourth stage is increased to the steady target power for the fourth stage. As a result of thus changing the target engine power, the actual engine power (i.e., the indicated torque) is increased after the delay time. Therefore, the transitional target drive force of the second motor-generator 8 is lowered gradually in prospect of such change in the engine power. Here, since the second motor-generator 8 is controlled electrically, the drive force thereof can be changed more promptly in comparison with the engine 1. Therefore, the output control of the second motor-generator 8 may be commenced from the point at which the actual torque of the engine 1 start changing. In the preferred example, however, the transitional target drive force of the second motor-generator 8 is lowered from the time point t3 so as to reduce the uncomfortable feeling resulting from an abrupt change in the drive force. To this end, the lowering gradient is determined in a manner to reduce the uncomfortable feeling based on a result of an experimentation or simulation.

After a lapse of the response delay time Td of the engine 1 (at point t4), the controls for the phase 4 are commenced. At the time point t4, the actual power of the engine 1 starts lowering. Therefore, the lowering gradient dNet for lowering the transitional target speed Nett is decreased, and the lowering gradient of the transitional target drive force of the second motor-generator 8 is determined in accordance therewith. As described, the engine speed Ne is controlled by operating the first motor-generator 4 as a generator, and the electric power generated by the first motor-generator 4 is supplied to the second motor-generator 8 to be consumed. Therefore, the electric balance is maintained as before. Then, when the transitional target speed Nett of the engine 1 is lowered substantially to the steady target speed Nets for the fourth stage, that is, when the difference between those speeds is reduced to the reference value β, the speed change is terminated and the normal controls for the engine 1 and the motor-generators 4 and 8 are carried out. Specifically, as in the conventional two-motor type hybrid vehicle, the target power of the engine 1 is calculated based on the vehicle speed and the opening degree of the accelerator, the target speed to achieve the target power in a fuel efficient manner is calculated, the first motor-generator 4 is controlled in a manner to achieve the target engine speed, and the second motor-generator 8 is driven by the electric power generated by the first motor-generator 4 to output a torque to the drive wheels.

Figure 3:
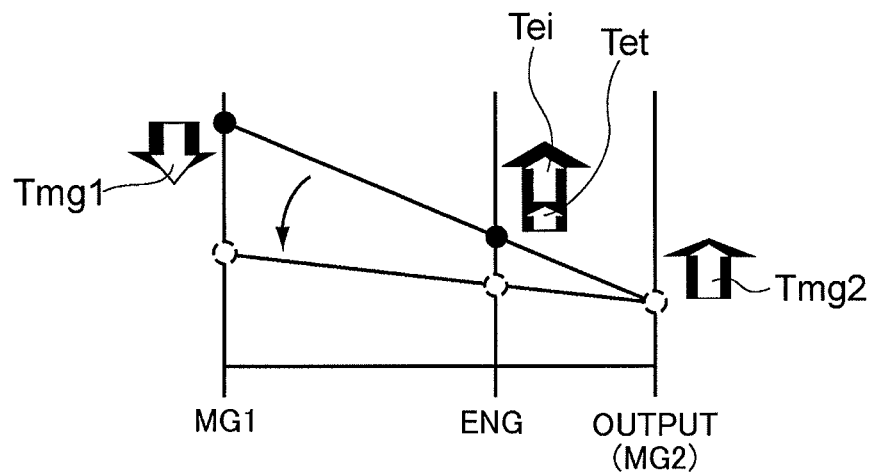
FIG. 3 is a nomographic diagram of a power distribution device showing a relation among the engine torque and torques (or generation amounts) of the motor-generators during upshifting.

Here will be explained a relation among the engine torque and the torques (or the generation amount) of the motor-generators 4 and 8 during the shifting operation with reference to the nomographic diagrams of the power distribution device 2. In FIG. 3, a black arrow represents a torque before or at the start of the upshifting, and a white arrow represents a torque during the upshifting. As described, the speed change control system of the present invention lowers the engine speed by the first motor-generator 4 when the power of the engine (ENG) 1 actually starts lowering after a lapse of the delay time during the upshifting. Therefore, an axial torque Ter of the engine 1 during the upshifting is comprised of an indicated torque Tet in accordance with the reduced opening degree of the throttle valve and an inertia torque Tei resulting from lowering the engine speed. In this situation, the indicated torque Tet is actually being lowered in response to the lowering demand of the engine power Pe, and the axial torque Ter is not significantly changed from the beginning of the upshifting. Therefore, a torque Tmg1 of the first motor-generator 4 controlling the engine speed is maintained as before until a lapse of the response delay time Td of the engine 1. In addition, the axial torque Ter of the engine 1 is not significantly increased during lowering the engine speed Ne so that the torque is maintained to the torque at the beginning of the upshifting. Moreover, since the axial torque Ter of the engine 1 as well as the inertia torque is not significantly increased, the torque distributed by the power distribution device 2 to be delivered to the output shaft 3 will not especially be changed. Consequently, the torque Tmg2 outputted from the second motor-generator 8 is maintained as before or at the start of the upshifting. Thus, a load of the first motor-generator 4 to generate an electric power will not be increased, and the electric power generated by the first motor-generator 4 is consumed by the second motor-generator 8. Therefore, the electric balance therebetween will not be deteriorated.

Figure 4:
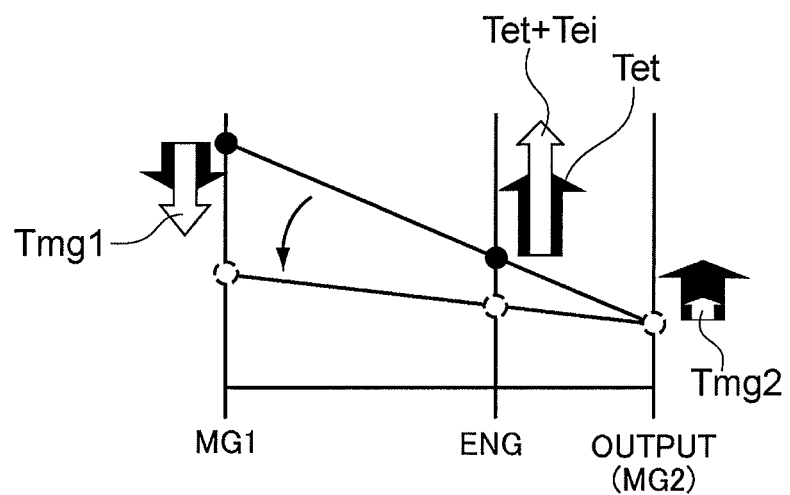
FIG. 4 is a nomographic diagram of the power distribution device showing a relation among the engine torque and torques (or generation amounts) of the motor-generators under a comparison example of lowering the engine speed compulsory by the motor-generator.

FIG. 4 is a nomographic diagram showing a relation among the torques under a comparison example in which the engine speed is lowered by the first motor-generator 4 without waiting for a commencement of an actual reduction in the engine power after the response delay. In this case, the engine speed is lowered during maintaining the indicated torque Tet of the engine 1 as before the upshifting. Therefore, the axial torque Ter of the engine 1 of this case is comprised of the indicated torque Tet and the inertia torque Tei. That is, the axial torque Ter of the engine 1 is increased to be larger than that just before the upshifting. In this situation, the first motor-generator 4 is required to output the torque Tmg1 against the axial torque Ter thus increased. Consequently, a generation amount of the first motor-generator 4 will be increased. Meanwhile, since the axial torque Ter of the engine 1 is thus increased, a direct torque delivered from the engine 1 to the output shaft 3 through the power distribution device 2 is increased. Therefore, the assist torque Tmg2 of the second motor-generator 8 has to be reduced in an increased amount of the direct torque. Consequently, an electric consumption of the second motor-generator 8 will be reduced to cause an electrical imbalance of the motor-generators 4 and 8. In this case, if the excessive electric power is stored in the storage device, the storage device will be overcharged thereby shortening a lifetime of the storage device.

Thus, the speed change control system of the present invention will not lower the engine speed compulsory by the first motor-generator 4 during the response delay time of the engine 1, when lowering the engine speed in response to the upshift demand. Therefore, the first motor-generator 4 will not generate the electric power excessively so that an overcharging and an over discharging of the electric storage device are avoided. In other words, the engine speed is controlled as before the upshifting during the response delay time of the engine 1 so that the electric balance between the motor-generators 4 and 8 is maintained. Moreover, during the upshifting for lowering the engine speed stepwise, the first motor-generator 4 will not output a torque against the inertia torque of the engine 1. Therefore, the drive torque will not be increased temporarily during the upshifting so that the shocks are reduced. In addition, the first motor-generator 4 outputs the torque required during the upshifting without excess and deficiency so that the engine speed can be changed promptly. For these reasons, the speed change operation of the hybrid vehicle can be executed stepwise and promptly without producing uncomfortable feeling so that the drivability is improved.

Figure 5:
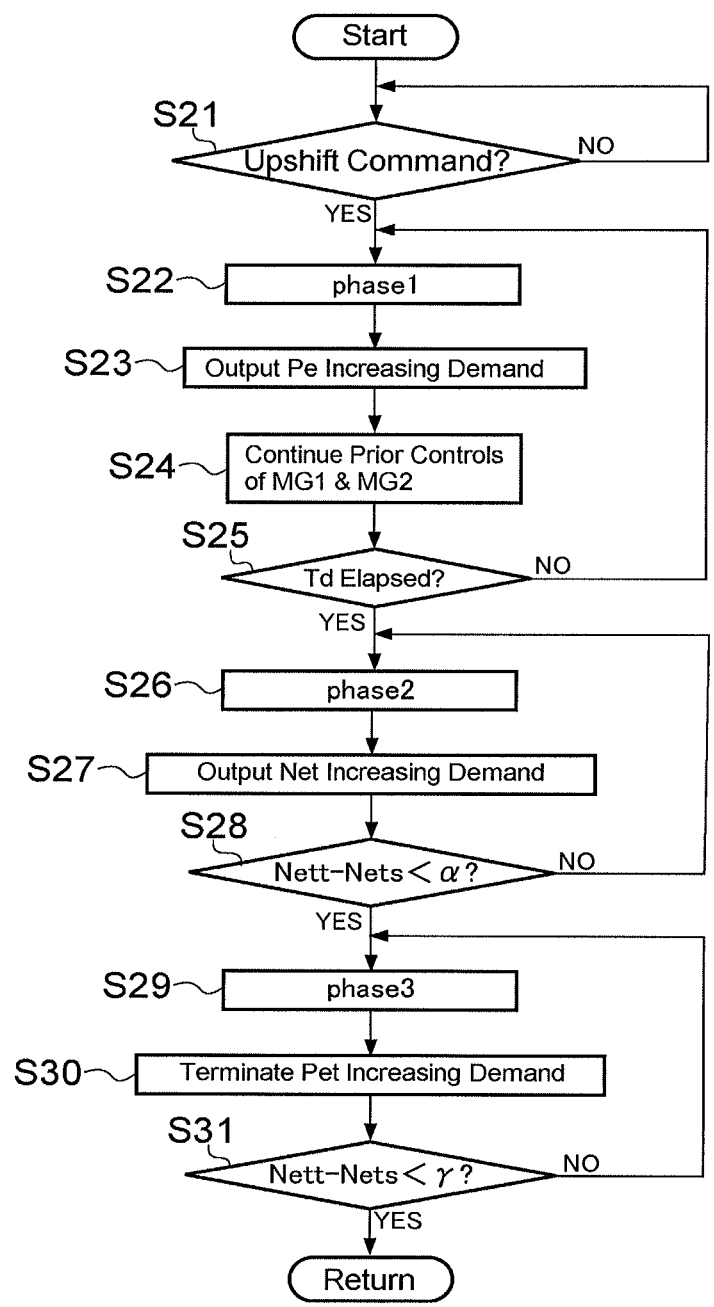
FIG. 5 is a flowchart showing one example of a downshift control carried out by the speed change control system of the present invention.

The speed change control system of the present invention is configured to carry out not only the upshifting for lowering the engine speed stepwise but also to carry out a downshifting for increasing the engine speed stepwise. The example of such downshifting will be explained with reference to the flowchart shown in FIG. 5. If a downshift command is outputted under a predetermined running condition, e.g., during decelerating the vehicle by returning the accelerator pedal so that the answer of step S21 is YES, a "phase 1" flag of downshifting is set (at step S22). This flag as well as the after-mentioned flags are also used in other controls related to the control shown in FIG. 5. Specifically, the downshift command is outputted when the driving condition of the vehicle such as an opening degree of the accelerator and a vehicle speed enter into the predetermined speed ratio region of low speed side from the speed ratio region of high speed side. Otherwise, the downshift command is outputted when a downshifting operation of a not shown shifting device is executed manually. By contrast, if the downshift command is not outputted so that the answer of step S21 is NO, the routine is returned without carrying out any specific control.

After carrying out the control of step S22, a demand to increase the engine power Pe is outputted (at step S23). Here, a target value of the engine power Pe to be increased can be calculated by adding the inertial energy (i.e., the inertia torque) required to increase the engine speed Ne to the engine power to be achieved after the downshifting (i.e., a negative torque).

After the downshifting, for example, if the throttle valve is closed to decelerate the vehicle by an engine braking force, the engine power is reduced to zero. That is, if a braking force is established by a pumping loss of the engine 1, the engine power of this case may be called a negative power. Then, after the downshifting, the engine power is increased in accordance with the inertia torque of the engine 1 resulting from increasing the engine speed Ne. Accordingly, the engine power after the downshifting can be calculated based on the inertia moment of the engine 1 and the angular acceleration such as a changing gradient of the engine speed.

The engine power Pe can be increased by a conventional method in response to the demand (i.e., the command) to increase the engine power Pe. For example, the engine power Pe can be increased by increasing a fuel supply (or a fuel injection). Alternatively, if a gasoline engine is used, the engine power Pe may also be increased by increasing an opening degree of the throttle valve to increase the air intake. In any of those cases, a timing at which the engine power actually starts increasing is delayed inevitably from a timing at which the command signal for increasing the engine power was outputted. For example, such response delay is caused by a fact that the inertia moment of the engine 1 is large, and that the air intake is not increased immediately. Accordingly, the response delay time (i.e., the dead time) Td may differ depending on a capacity and a speed of the engine 1, the kind of a means for increasing the power, and so on. However, a length of the response delay time Td may be measured in advance.

Thus, even if the demand to increase the engine power is outputted at step S23, the engine power will not be increased immediately. Therefore, the first and the second motor-generators 4 and 8 are controlled by the same way as before the downshift command was outputted (at step S24). As described, the hybrid vehicle may be controlled as the vehicle having the geared transmission. In this case, a target speed Net of the engine is determined in a manner such that the engine speed is changed in accordance with the vehicle speed and the opening degree of the accelerator (i.e., the drive demand) in each speed ratio region. To this end, a relation of the vehicle speed or the drive demand to the engine speed may be determined arbitrarily. Therefore, such relation may be not only differentiated in each speed ratio region, but also assimilated in any of the speed ratio regions. Such relation is preinstalled in the ECU 10 in the form of a map or an arithmetic expression for each speed ratio region. That is, at step S24, prior controls of the first motor-generator 4 and the second motor-generator 8 are continued. Specifically, the relation of the vehicle speed or the drive demand to the engine speed is maintained to the relation determined for the speed ratio region of high speed side, or the target engine speed is maintained to the prior value, as before a judgment of the downshifting was satisfied. More specifically, a motor torque of the first motor-generator 4 and a regenerative torque of the second motor-generator 8 are continuously controlled in such a manner that the driving condition stays in the speed ratio region of high speed side, as before the downshifting. That is, the torque is not kept constant and flexibly controlled depending on the running condition of the vehicle. In this situation, therefore, if the opening degree of the accelerator is changed during the dead time Td, the torques of the first and the second motor-generators 4 and 8 can be changed in accordance with the change in the opening degree of the accelerator.

Accordingly, the engine speed Ne will not be increased compulsory by the first motor-generator 4 immediately after outputting the downshift command, that is, during the response delay time Td. Therefore, the electric power required for the first motor-generator 4 or consumed by the first motor-generator 4 will not be increased so that an over discharging of the not shown storage device is prevented. In addition, since the motor-generators 4 and 8 are controlled as before the satisfaction of judgment of downshifting, the electric power generated by the second motor-generator 8 is consumed by the first motor-generator 4. Therefore, the electric balance therebetween will not be changed so that the overcharging and the over discharging are prevented.

After carrying out the control of step S24, then it is determined whether or not the response delay time Td of the engine 1 has elapsed (at step S25). As described, a length of the response delay time Td is measured in advance. Therefore, if a period from the output of the downshift command has reached the response delay time Td, it is determined at step S25 that the response delay time Td has elapsed. If the answer of step S25 is YES, a "phase 2" flag of downshifting is set (at step S26). In contrast, if the answer of step S25 is NO, the routine is returned to step S22 to continue the controls of steps S23 and S24.

During the phase 2 of downshifting after the lapse of the response delay time Td of the engine 1, the power of the engine 1 and the engine speed Ne start increasing. Therefore, under the phase 2, a demand to increase the target engine speed Net (i.e., an increasing command) is outputted (at step S27). The target engine speed Net after the downshifting can be determined in advance based on a coefficient corresponding to a speed ratio determining a relation between the vehicle speed and the engine speed to be achieved in the speed ratio region after the upshifting. That is, the target engine speed Net may also be called the steady target speed Nets. At step S27, specifically, the transitional target speed Nett of the engine 1 during increasing the engine speed toward the steady target speed Nets is increased gradually. The purpose of setting the transitional target speed Nett is to change the engine speed without producing any uncomfortable feeling resulting from shocks caused by the inertia torque, or by an abrupt change or a slow change in the engine speed. To this end, as known in the conventional art, the transitional target speed Nett is determined by applying a rounding process or a first order lagging process to the steady target speed Nets. Accordingly, the torque or the speed of the first motor-generator 4 is controlled in a manner such that the engine speed Ne is changed to achieve the transitional target speed Nett. As a result, the actual engine speed Ne is increased gradually at a gradient (i.e., a change rate) dNet determined by a rounding coefficient or a first order lag coefficient governing the transitional target speed Nett.

After the delay time or dead time Td has elapsed, the output torque of the engine 1 under control (i.e., an indicated torque) starts increasing. In this situation, however, a torque to compensate an inertia torque resulting from increasing the speed. Here, as described, an increasing amount in the power of the engine 1 is calculated taking account of the inertia torque, or corresponds to the inertia torque. In this situation, even if the first motor-generator 4 is operated as a motor, the electric power generated by the second motor-generator 8 outputting the regeneration torque is used to drive the first motor-generator 4. Therefore, the electric balance between the motor-generators 4 and 8 is maintained so that the overcharging and an over discharging of the electric storage device will not be caused.

Then, it is determined whether or not a difference between the transitional target speed Nett and the steady target speed Nets becomes smaller than the reference value α (at step S28). As described, the feedback control of the first motor-generator 4 is carried out to increase the engine speed Ne gradually at the predetermined gradient, but the increase in the engine speed Ne is delayed inevitably. Therefore, in order not to increase the engine speed Ne higher than the steady target speed Nets, that is, in order not to cause an overshoot, a timing to terminate the control of increasing the engine power Pe and the engine speed Ne is accelerated. To this end, the reference value α is used to determine whether or not to accelerate the termination. Specifically, the reference value α is determined based on an experimental result taking account of the response delay times of the engine 1 and the first motor-generator 4, an eventual changing condition of the drive torque, an existence of shocks or a magnitude thereof and etc.

If the transitional target speed Nett has not yet been increased sufficiently so that the answer of step S28 is NO, the routine is returned to step S26 to continue to output the demand to increase the target engine speed Net (i.e., the increasing command). By contrast, if the answer of step S28 is YES, a "phase 3" flag of downshifting is set (at step S29), and the control to output the demand to increase the engine power Pe (i.e., the increasing command) is terminated (at step S30). As described, the control to output the demand for increasing the engine power Pe is commenced at step S23, so as to add the power corresponding to the inertia torque generated as a result of increasing the engine speed to the engine power after the downshifting. At step S30, therefore, the control for increasing the engine power in the amount of the inertia torque is terminated. That is, the target value of the engine power Pe is achieved after the termination of the downshifting. Therefore, if the vehicle is decelerated by the engine braking force, an opening degree of the throttle valve is reduced to zero.

As the case of increasing the engine power Pe at step 23, although a demand value (i.e., a command value) for increasing the engine power Pe is changed stepwise, the indicated torque of the engine 1 and the actual torque will not be increased immediately due to the response delay. However, the drive torque established by the engine 1 will be increased eventually. Therefore, in order to prevent an abrupt change in the drive force and resultant shocks at the end of the increasing, the increasing gradient dNet of the transitional target speed Nett of the engine 1 may be decreased to be smaller than that under the phase 2.

Then, it is determined whether or not a difference between the transitional target speed Nett thus lowered and the steady target speed Nets becomes smaller than a reference value γ (at step S31). That is, a termination of the downshifting is judged at step S31, and for this purpose, the reference value γ is set to a small value, e.g., to almost zero. If the transitional target speed Nett is still large and not yet increased close enough to the steady target speed Nets so that the answer of step S31 is NO, the routine is returned to step S29 to continue the controls for the phase 3. Specifically, the control of increasing the target speed Net of the engine 1 at the decreased lowering gradient is continued, and the control of increasing the transitional target drive force gradually to the steady target drive force after the speed change is continued. In contrast, if the engine speed Ne is substantially increased to the steady target speed Nets as the target speed after the speed change so that the answer of step S31 is YES, the downshifting is terminated and the routine is returned to terminate the control shown in FIG. 5. That is, each flag is reset, the control of increasing the target engine speed Net is terminated, and the target engine speed is determined based on the drive demand such as an opening degree of the accelerator and a vehicle speed.

Figure 6:
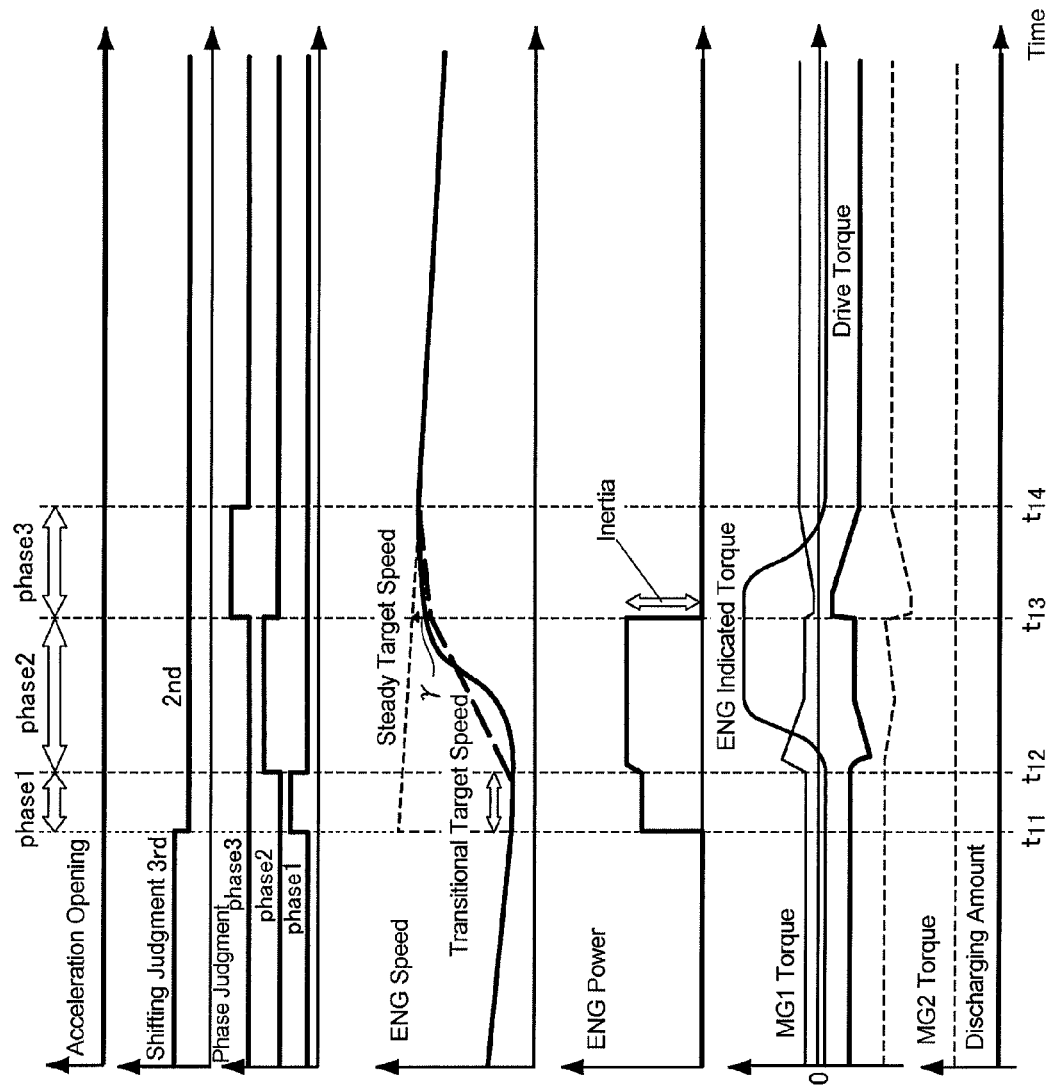
FIG. 6 is a time chart indicating an example of changing the target engine speed, the target engine power, the torques of the engine and the second motor-generator and the target drive force of a hybrid vehicle under the control shown in FIG. 5.

As described, the present invention is applied to the two-motor type hybrid vehicle in which the engine speed or the substantial speed ratio can be changed stepwise. FIG. 6 is a time chart showing an example of changes in the target engine speed, the target engine power, the torques of the engine 1 and the second motor-generator 8, and the target drive force of the hybrid vehicle thus structured, under the situation that the gear stage is shifted from the third stage to the second stage by the control shown in FIG. 5. Provided that the opening degree of the throttle valve is reduced to zero under the third stage so that the vehicle speed is lowered and the running condition of the vehicle enters into the speed ratio region of the second stage, a judgment to carry out an downshifting to the second stage is satisfied with reference to the map based on the vehicle speed and the opening degree of the accelerator (at point t11). Otherwise, the judgment to carry out the downshifting to the second stage is also satisfied when the shifting device is operated manually. Accordingly, the control of phase 1 is commenced at the time point t1. Specifically, the steady target speed Nets of the engine 1 is increased to the speed for the second stage, and the target power of the engine 1 is increased. Since the response of the engine 1 is delayed inevitably, the target value of the engine power to be increased is determined based on the current engine speed and the steady target speed in prospect of such delay.

At the time point t11, the control for increasing the engine speed compulsory by the first motor-generator 4 is not carried out so that the first motor-generator 4 is controlled in a same manner as under the third stage. Therefore, the second motor-generator 8 that applies the electric power to the first motor-generator 4 is also controlled in a same manner as under the third stage. That is, since the transitional target drive force of the second motor-generator 8 is thus controlled in a same manner as under the third stage, the target drive force of entirely of the vehicle is maintained to the drive force under the third stage. In addition, the electric balance is maintained so that an overcharging and an over discharging of the electric storage device will not occur.

After a lapse of the response delay time (i.e., the dead time) Td of the engine 1 (at point t12), the controls for the phase 2 of the downshifting are commenced. Specifically, the control for increasing the target engine power (e.g., a control for increasing the opening degree of the throttle valve) is carried out so that the engine power starts increasing from the time point t12. At the time point t12, the control for increasing the engine speed Ne is also commenced. Specifically, as described, the transitional target speed Nett is determined by applying the rounding process or the first order lagging process to the steady target speed Nets, and the first motor-generator 4 is controlled in a manner such that the engine speed Ne is changed while following the transitional target speed Nett. In the example shown in FIG. 6, the first motor-generator 4 functions as a motor and the output torque thereof is used to increase the engine speed. In this situation, however, the target power of the engine 1 is increased so that the speed of the engine 1 is increased. Therefore, the power to be consumed by the first motor-generator 4 will not be especially increased, and such power required for the first motor-generator 4 is generated by the regeneration of the second motor-generator 8. Therefore, the electric balance will not be deteriorated. In other words, an overcharging and an over discharging of the electric storage device connected with the motor-generators and 8 can be prevented. In addition, the engine speed can be increased smoothly and promptly toward the target value.

Thus, the engine speed is increased from the time point t12. Therefore, the target power of the engine 1 is increased to the value including the inertia torque that changes the engine speed. In FIG. 6, specifically, there is shown the example of decelerating the vehicle intentionally by carrying out the downshifting by a manual operation. To this end, the engine speed is increased by increasing the engine power while increasing the torque of the first motor-generator 4 functioning as a motor. Consequently, a braking torque (i.e., a negative torque resulting from regeneration) of the second motor-generator 8 is slightly increased. During such control, the drive torque (i.e., the negative torque or the braking torque) of the vehicle is temporarily increased. However, such change in the drive torque is intended by the driver so that the driver will not feel any uncomfortable feeling. In addition, an amount of such linear change is slight so that the electric balance will not be deteriorated.

Then, when the transitional target speed Nett is increased so that the difference between the transitional target speed Nett and the steady target speed Nets becomes smaller than a reference value γ (at point t13), the controls for the phase 3 of downshifting are commenced. That is, the control for increasing the target engine power is terminated. In the example shown in FIG. 6, specifically, the opening degree of the throttle valve is reduced to zero. In addition, the increasing gradient dNet of the transitional target speed Nett of the engine 1 is decreased so that the torques of the motor-generators 4 and 8 are temporarily lowered and then increased gradually to the prior value. In this situation, as a result of thus decreasing the increasing gradient dNet of the engine 1, the inertia torque is changed thereby reducing the drive torque (i.e., the braking torque). Therefore, in order to compensate such reduction in the drive torque, the (negative) torque of the second motor-generator 8 is increased. However, the electric balance will not be changed significantly. Then, when the transitional target speed Nett of the engine 1 is increased substantially to the steady target speed Nets for the second stage, that is, when the difference between those speeds is reduced substantially to the reference value γ, the speed change is terminated and the normal controls for the engine 1 and the motor-generators 4 and 8 are carried out. That is, the normal controls for decelerating the two-motor type hybrid vehicle by the engine braking force are carried out. Specifically, the second motor-generator 8 establishes the regenerative torque, and the generated electric power is delivered to drive the first motor-generator 4 as a motor thereby controlling the engine speed by the braking torque of the first motor-generator 4.

Figure 7:
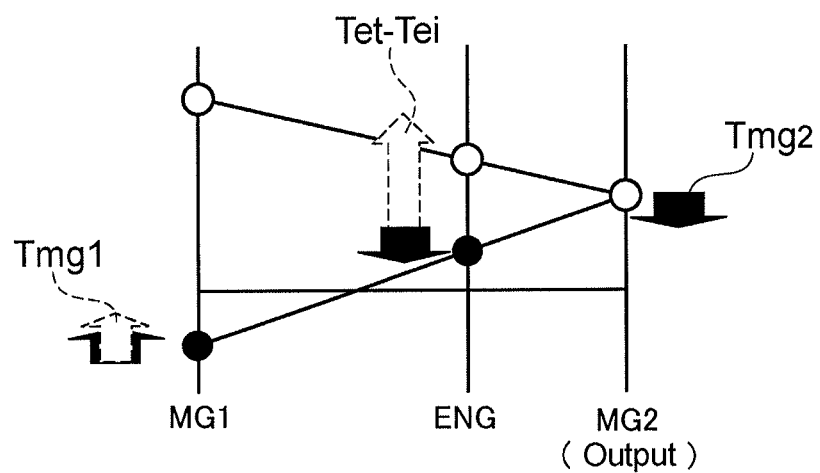
FIG. 7 is a nomographic diagram of the power distribution device showing a relation among the engine torque and torques (or generation amounts) of the motor-generators during downshifting.

Here will be explained a relation among the engine torque and the torques (or the generation amount) of the motor-generators 4 and 8 during the downshifting for increasing the engine speed stepwise with reference to the nomographic diagrams of the power distribution device 2. In FIG. 7, a black arrow represents a torque before or at the beginning of the downshifting, and a white arrow represents a torque during the downshifting. As described, the speed change control system of the present invention increases the engine speed by the first motor-generator 4 when the power of the engine 1 actually starts increasing after a lapse of the delay time Td during the downshifting. Therefore, the axial torque Ter of the engine 1 during the downshifting is calculated by subtracting inertia torque Tei resulting from increasing the engine speed from the indicated torque Tet in accordance with the opening degree of the throttle valve. In this situation, the indicated torque Tet is actually increased in response to the increasing demand of the engine power. That is, unlike the negative torque at the beginning of downshifting, the indicated torque Tet is positive to increase the engine speed. Therefore, a torque Tmg1 of the first motor-generator 4 controlling the engine speed is maintained as before until a lapse of the response delay time Td of the engine 1. In addition, the axial torque Ter of the engine 1 has already been increased during increasing the engine speed Ne so that the engine speed can be increased by a small torque. Moreover, since the second motor-generator 8 generates an electric power required for the first motor-generator 4 by regenerating the energy, the electric balance will not be changed.

Figure 8:
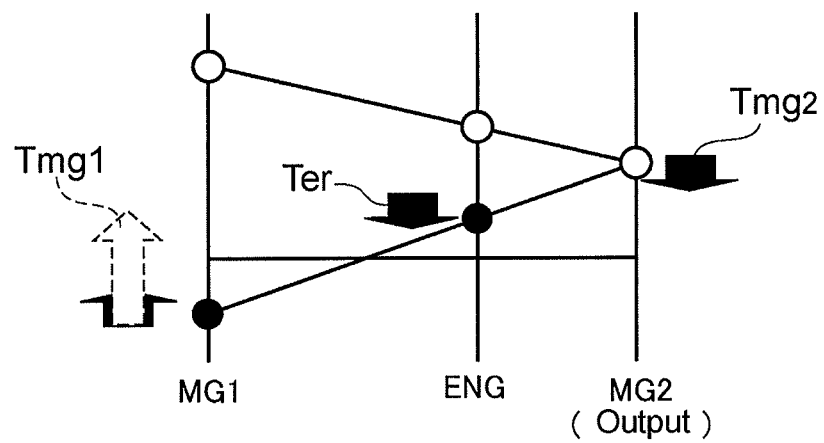
FIG. 8 is a nomographic diagram of the power distribution device showing a relation among the engine torque and torques (or generation amounts) of the motor-generators under a comparison example of increasing the engine speed compulsory by the motor-generator.

FIG. 8 is a nomographic diagram showing a relation among the torques under a comparison example in which the engine speed is increased by the first motor-generator 4 to the target value after the speed change. In this case, the first motor-generator 4 is required to generate a large torque containing a torque for increasing the engine speed and an inertia torque resulting from changing the engine speed. In this case, however, a braking force or a regenerative torque of the second motor-generator 8 cannot be increased to exceed the required braking force. Therefore, a generation amount of the second motor-generator 8 will not be changed as before the downshifting. That is, a required electric power for operating the first motor-generator 4 is relatively larger than the generation amount of the second motor-generator 8. Consequently, an over discharging of the electric storage device is caused.

Thus, the speed change control system of the present invention will not increase the engine speed compulsory by the first motor-generator 4 during the response delay time of the engine 1, when lowering the engine speed in response to the downshift demand. Therefore, the first motor-generator 4 will not consume the electric power excessively so that an overcharging and an over discharging of the electric storage device are avoided. In other words, the engine speed is controlled as before the downshifting during the response delay time of the engine 1 so that the electric balance between the motor-generators 4 and 8 is maintained. Moreover, the engine itself outputs a torque for increasing the speed thereof during the downshifting. Therefore, the negative inertia torque resulting from increasing the engine speed will not appear as the drive torque so that the shift shocks are reduced. In addition, the electric power required for the first motor-generator 4 to increase the engine speed can be generated by the second motor-generator 8. Therefore, the output torque of the first motor-generator 4 will not be restricted or fall short so that the engine speed can be changed promptly. For these reasons, the speed change operation of the hybrid vehicle can be executed stepwise and promptly without producing uncomfortable feeling so that the drivability is improved.

Here will be briefly explained a relation between the foregoing examples and the present invention. A functional means of the electronic control unit for carrying out the control of steps S3 or S23 serves as the first power control means of the invention, a functional means of the electronic control unit for carrying out the control of steps S4 or S24 serves as the first speed control means of the invention, a functional means of the electronic control unit for carrying out the control of steps S7 or S27 serves as the second speed control means of the invention, and a functional means of the electronic control unit for carrying out the control of steps S10 or S30 serves as the second power control means of the invention.

The present invention should not be limited to the foregoing example. For example, another member such as an output gear may serve as the output member instead of the output shaft, and a structure thereof may be altered arbitrarily within a scope of claims.

The invention claimed is:

1. A speed change control system for a hybrid vehicle that includes a first motor that has at least any of an electric generating function and a torque generating function, a differential mechanism that distributes a power of an internal combustion engine to the first motor and to an output member and that changes a speed of the internal combustion engine in accordance with a speed of the first motor, and a second motor that has at least any of an electric generating function and a torque generating function and that exchanges a torque with any of wheels, comprising:
an electronic control unit configured to:
output a command for changing a power of the internal combustion engine in a direction to expedite a change in a speed of the internal combustion engine, at the beginning of a speed change operation for changing the speed of the internal combustion engine stepwise;
continue controls of the first and the second motors as before the speed change operation, during a period from a point at which the command for changing the power of the internal combustion engine is outputted to a point at which a time corresponding to a response delay of the internal combustion engine elapses;

control the first motor in a manner such that the speed of the internal combustion engine is changed in a direction to be changed by the change in the power of the internal combustion engine, after a lapse of the time corresponding to the response delay of the internal combustion engine; and output a command for changing the power of the internal combustion engine to a power to be achieved after the speed change operation, as the speed of the internal combustion engine is changed substantially to a target speed to be achieved after the speed change operation.

2. The speed change control system for a hybrid vehicle as claimed in claim 1, wherein the electronic control unit is further configured to:

output a command for lowering the power of the internal combustion engine when carrying out an upshifting for lowering the speed of the internal combustion engine stepwise;

consume an electric power generated by the first motor as a result of lowering the speed of the internal combustion engine after the lapse of the time corresponding to the response delay of the internal combustion engine, by delivering the electric power to the second motor thereby operating the second motor to output a torque to the output member; and output a command for increasing the power of the internal combustion engine to the power to be achieved after the speed change operation, as the speed of the internal combustion engine is changed substantially to the target speed to be achieved after the speed change operation.

3. The speed change control system for a hybrid vehicle as claimed in claim 2, wherein the electronic control unit is further configured to output a command for the internal combustion engine to output a power achieved by subtracting a power corresponding to an inertia torque resulting from changing the speed of the internal combustion engine from the power to be achieved after the upshifting.

4. The speed change control system for a hybrid vehicle as claimed in claim 2, wherein the electronic control unit is further configured to:

output the command for increasing the power of the internal combustion engine at a timing when the speed of the internal combustion engine is not lowered to be lower than a target speed to be achieved after the speed change operation due to a response delay until the power of the internal combustion engine is changed actually; and control the first motor to lower the speed of the internal combustion engine at a lowering rate as before the command for increasing the power of the internal combustion engine was outputted, during a period from a point at which the command was outputted to a period at which the time corresponding to the response delay of the internal combustion engine elapsed.

5. The speed change control system for a hybrid vehicle as claimed in claim 2, wherein the electronic control unit is further configured to:

decrease the lowering rate of the speed of the internal combustion engine after the time corresponding to the response delay of the internal combustion engine has elapsed from the point at which the command for increasing the power of the internal combustion engine was outputted; and lower the torque of the second motor toward the target torque to be achieved after the speed change operation when the command for increasing the power of the internal combustion engine is outputted.

6. The speed change control system for a hybrid vehicle as claimed in claim 1, wherein the electronic control unit is further configured to:

output the command for increasing the power of the internal combustion engine when carrying out a downshifting for increasing the speed of the internal combustion engine stepwise while regenerating energy by the second motor;

consume an electric power generated by regenerating energy by the second motor after the lapse of the time corresponding to the response delay of the internal combustion engine, by delivering the electric power to the first motor thereby increasing the speed of the internal combustion engine by a torque generated by the first motor; and output a command for lowering the power of the internal combustion engine to the power to be achieved after the speed change operation, as the speed of the internal combustion engine is changed substantially to the target speed to be achieved after the speed change operation.

7. The speed change control system for a hybrid vehicle as claimed in claim 6, wherein the electronic control unit is further configured to output a command for the internal combustion engine to output a power achieved by adding a power corresponding to an inertia torque resulting from changing the speed of the internal combustion engine to the power to be achieved after the downshifting.

8. The speed change control system for a hybrid vehicle as claimed in claim 1, wherein the electronic control unit is further configured to decrease a gradient to change the speed of the internal combustion engine after the command to change the power of the internal combustion engine to the power to be achieved after the speed change operation was outputted, to the gradient smaller than that before the command was outputted.

9. A speed change control method for a hybrid vehicle that comprises a first motor that has at least any of an electric generating function and a torque generating function, a differential mechanism that distributes a power of an internal combustion engine to the first motor and to an output member and that changes a speed of the internal combustion engine in accordance with a speed of the first motor, and a second motor that has at least any of an electric generating function and a torque generating function and that exchanges a torque with any of wheels, comprising:

outputting, by an electronic control unit, a command for changing a power of the internal combustion engine in a direction to expedite a change in a speed of the internal combustion engine, at the beginning of a speed change operation for changing the speed of the internal combustion engine stepwise;

continuing controls of the first and the second motors as before the speed change operation, during a period from a point at which the command for changing the power of the internal combustion engine is outputted to a point at which a time corresponding to a response delay of the internal combustion engine elapses;

controlling, by the electronic control unit, the first motor in a manner such that the speed of the internal combustion engine is changed in a direction to be changed by the change in the power of the internal combustion engine, after a lapse of the time corresponding to the response delay of the internal combustion engine; and outputting, by the electronic control unit, a command for changing the power of the internal combustion engine to a power to be achieved after the speed change operation, when the speed of the internal combustion engine is changed substantially to a target speed to be achieved after the speed change operation.

* * * * *